(12) United States Patent
Herdendorf et al.

(10) Patent No.: US 11,842,753 B2
(45) Date of Patent: Dec. 12, 2023

(54) JUKEBOX DATA STORAGE SYSTEM WITH INERT ENVIRONMENT

(71) Applicant: Seagate Technology LLC, Fremont, CA (US)

(72) Inventors: Brett R. Herdendorf, Mound, MN (US); Riyan Alex Mendonsa, Edina, MN (US); Krishnan Subramanian, Shakopee, MN (US); Shawn A. Ruden, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/846,231

(22) Filed: Jun. 22, 2022

(65) Prior Publication Data

US 2023/0054813 A1    Feb. 23, 2023

Related U.S. Application Data

(60) Provisional application No. 63/235,449, filed on Aug. 20, 2021.

(51) Int. Cl.
  *G11B 33/14*    (2006.01)
  *G11B 27/00*    (2006.01)
  (Continued)

(52) U.S. Cl.
  CPC .......... *G11B 27/002* (2013.01); *G11B 17/021* (2013.01); *G11B 17/225* (2013.01)

(58) Field of Classification Search
  CPC ......... G11B 5/6082; G11B 5/484; G11B 5/60; G11B 5/6005; G11B 5/6064; G11B 21/21;
  (Continued)

(56) References Cited

U.S. PATENT DOCUMENTS

| 5,454,157 A | 10/1995 | Ananth et al. |
| 6,144,178 A * | 11/2000 | Hirano ............... G11B 33/1486 318/476 |

(Continued)

OTHER PUBLICATIONS

Nitrogen Gas Generation N2 Pack: About N2 Pack: PSA Nitrogen Generation (https://www.hitachi-ies.co.jp/english/products/n2/psa/index.htm), Retrieved on Jun. 29, 2021.

*Primary Examiner* — Nabil Z Hindi
(74) *Attorney, Agent, or Firm* — Westman, Champlin & Koehler, P.A.

(57) ABSTRACT

A system includes a library compartment, a player and a gas generator. The library compartment houses a plurality of data storage disks. The player is external to the library compartment and comprises a head that is configured to interact with at least one of the plurality of data storage disks. The gas generator is fluidly connected to the player. An embodiment includes a partition between the library compartment and player, the partition including a selectively openable interlock. In an embodiment, the player has a negative fluid pressure relative to the library compartment. A method of controlling an environment in a disk player is also described. The method includes detecting a composition of a fluid environment in the disk player and detecting a pressure of the fluid environment in the disk player.

19 Claims, 13 Drawing Sheets

(51) Int. Cl.
  *G11B 17/02*  (2006.01)
  *G11B 17/22*  (2006.01)

(58) Field of Classification Search
  CPC ..... G11B 17/043; G11B 17/03; G11B 17/044;
    G11B 17/0485; G11B 33/125; G11B
    33/14; G11B 17/022; G11B 17/028;
    G11B 33/1446
  USPC .................................... 360/75, 97.21, 99.12
  See application file for complete search history.

(56) References Cited

U.S. PATENT DOCUMENTS

| | | |
|---|---|---|
| 6,236,532 B1 | 5/2001 | Yanagisawa |
| 6,560,064 B1 * | 5/2003 | Hirano ............... G11B 33/1413 360/97.12 |
| 6,683,747 B2 * | 1/2004 | Bernett ................ G11B 33/148 |
| 7,353,525 B1 | 4/2008 | Dorbeck et al. |
| 7,777,986 B2 | 8/2010 | Barkley et al. |
| 7,876,528 B2 | 1/2011 | Uefune et al. |
| 7,957,092 B2 | 6/2011 | Ichikawa et al. |
| 8,564,900 B2 | 10/2013 | Hirono et al. |
| 8,638,524 B2 | 1/2014 | Brown |
| 8,705,202 B2 | 4/2014 | Hirono et al. |
| 8,782,677 B2 | 7/2014 | Yoshida et al. |
| 8,934,194 B2 | 1/2015 | Schreck |
| 8,958,173 B1 | 2/2015 | Hirano et al. |
| 9,025,277 B1 | 5/2015 | Hirano |
| 9,704,538 B2 * | 7/2017 | Vlassarev .......... G11B 33/1486 |
| 9,799,377 B1 | 10/2017 | Henry |
| 9,870,806 B2 | 1/2018 | Onobu et al. |
| 10,468,071 B1 | 11/2019 | Tasaka et al. |
| 11,023,352 B2 | 6/2021 | Gaertner et al. |
| 2009/0234500 A1 * | 9/2009 | Tanaka ................... G11B 33/08 700/250 |

* cited by examiner

JUKEBOX DATA STORAGE SYSTEM WITH INERT ENVIRONMENT

CROSS REFERENCE TO RELATED APPLICATIONS

This application claims the benefit of priority of U.S. Provisional Patent Application No. 63/235,449, filed Aug. 20, 2021, which is hereby incorporated by reference in its entirety.

SUMMARY

In one embodiment, a system comprises a library compartment, a player, a partition between the library compartment and player, and a gas generator. The library compartment houses a plurality of data storage disks. The player comprises at least one head that is configured to interact with at least one of the plurality of data storage disks. The partition comprises a selectively openable interlock. The gas generator is configured to supply gas to the player. The player has a negative fluid pressure relative to the library compartment.

In another embodiment, a system comprises a library compartment, a player and a gas generator. The library compartment houses a plurality of data storage disks. The player is external to the library compartment and comprises at least one head that is configured to interact with at least one of the plurality of data storage disks. The gas generator is fluidly connected to the player.

In yet another embodiment, a method of controlling an environment in a disk player is described. The method comprises producing gas with a generator and directing the produced gas to the disk player; opening an enclosure of the disk player, thereby allowing exterior fluid (such as gas or liquid) to flow into the disk player; detecting a composition of a fluid environment in the disk player; directing a first volume of the produced gas from the generator to the disk player when the detected composition does not comprise a threshold level of the produced gas; detecting a pressure of the fluid environment in the disk player; and removing a second volume of fluid from the disk player to maintain the pressure of the fluid environment in the disk player below a pressure of the exterior fluid.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1:
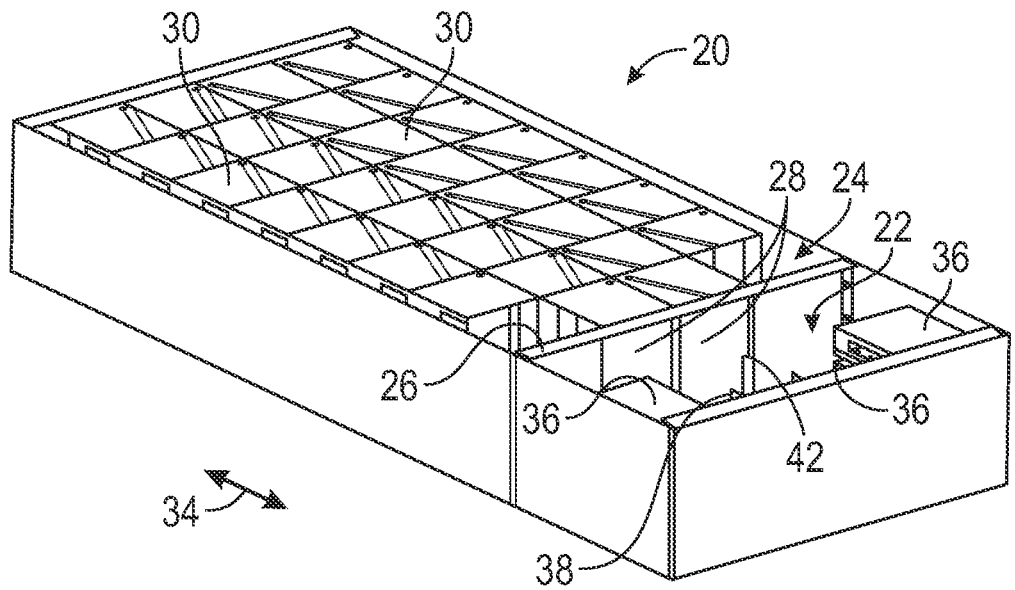
FIG. 1 is a perspective view of an exemplary jukebox data storage system with its cover removed so that internal parts are visible.

The present disclosure generally relates to data storage devices that utilize magnetic storage media, such as hard disk drives (HDD). The storage capacity of hard disk drives has steadily increased due to an increase in areal density. Increased storage capacity (gauged by parameters such as tracks per inch (TPI)) is provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example.

In general, embodiments of the disclosure relate to a jukebox data storage system. With the move to heat-assisted magnetic recording (HAMR), there are ever increasing expectations for write power on hours (WPOH) performance for the heads in the jukebox. Use of an inert atmosphere such as one including helium, nitrogen, or a blend thereof, for example, with HAMR can prevent oxidation of near field transducers (NFT). Moreover, filling a hard disk drive with a gas that is less dense than air reduces drag on the head components, thereby improving performance and reducing power usage. However, a jukebox system has many moving parts; therefore, is very difficult to seal in order to maintain a non-air atmosphere.

In the current disclosure, a jukebox system uses a generator to generate an inert gas such as nitrogen from the ambient air. Because a constant source of inert gas is provided to the jukebox enclosure, even if there are some leaks, the inert gas can be easily and constantly replenished to the jukebox enclosure. An inert atmosphere area around a HAMR head has the ability to prolong its useful life. A container or housing of the player surrounds the media reading and writing head or transducer and is isolated from media containers that surround disk stacks that are not currently in proximity with the player.

In an exemplary embodiment, the head enclosure or player has a negative pressure relative to a media container to increase performance due to reduced drag. Head operation can also result in particulate generation in the event of a crash, and head isolation prevents such debris from contaminating other parts. Moreover, lower pressure in the player relative to other jukebox areas helps to ensure that any particulates do not spread to other areas. Interlocks between different areas of the jukebox enclosure maintain the differential pressures.

In an exemplary embodiment, nitrogen is chosen as the inert gas that is generated and supplied to the jukebox enclosure due to its abundance in ambient air, though other inert gasses or mixtures are possible as well. To reduce power consumption for nitrogen generation, the nitrogen is funneled into the player, where it is most beneficial for extending head longevity.

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments in which the elements are indirectly connected, coupled or attached to each other.

FIG. 1 is a perspective view of an exemplary jukebox data storage system 20 with its cover removed so that internal components are visible. It is to be understood that in operation, a cover would be provided so that the jukebox system 20 is enclosed. Therefore, gas pressure zones within the jukebox system 20, described below, can be maintained. In an exemplary embodiment, jukebox system 20 includes a disk handling compartment 22 that is fluidly isolated from a library compartment 24 by a partition 26 with selectively operable interlocks 28.

Figure 14:
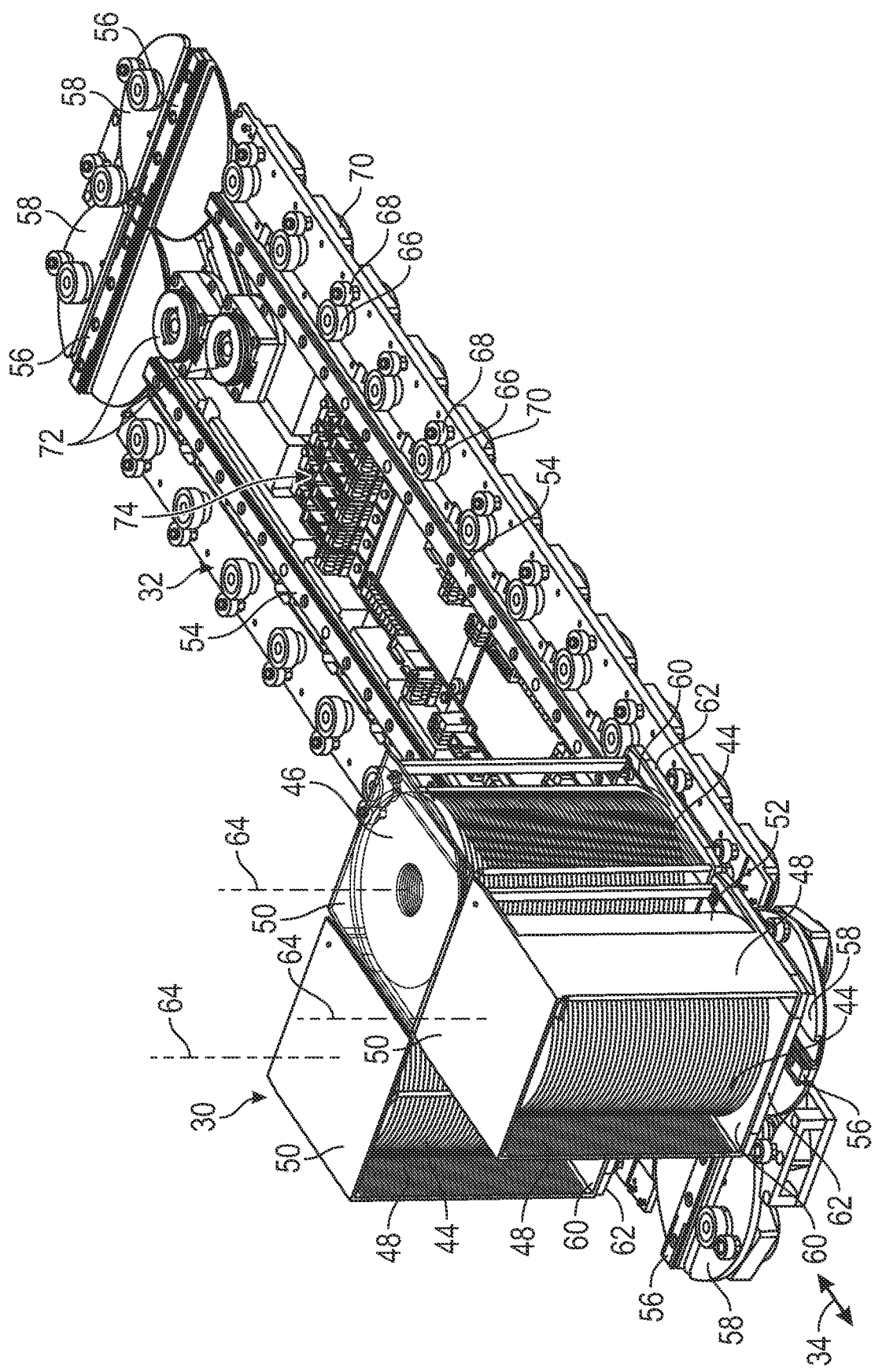
FIG. 14 is a perspective view of an exemplary caddy transport system.

In an exemplary embodiment, library compartment 24 contains a plurality of movable disk caddies 30, each caddy 30 configured to hold one hundred data storage disks. In the illustrated embodiment, thirty such caddies 30 are shown, with an empty space provided for each bank of fifteen caddies, so that caddy positions within the library compartment can be changed. FIG. 14 shows bank support assembly 32, upon which the caddies 30 move. In an exemplary embodiment, each bank support assembly 32 supports fifteen caddies 30 and is elongated in a longitudinal direction 34.

Referring back to FIG. 1, in an exemplary embodiment, a plurality of media or disk players 36 is positioned within disk handling compartment 22. Each of the players 36 has a housing with a cavity therein, wherein the cavity is configured to contain the disk drive components shown in FIG. 20. In an exemplary embodiment, each of the disk players 36 is itself a fluidly sealed enclosure during primary operation, though fluid flow can occur between the interior of a disk player 36 and the disk handling compartment 22 during disk insertion into the player 36 and removal from the player 36.

Figure 2:
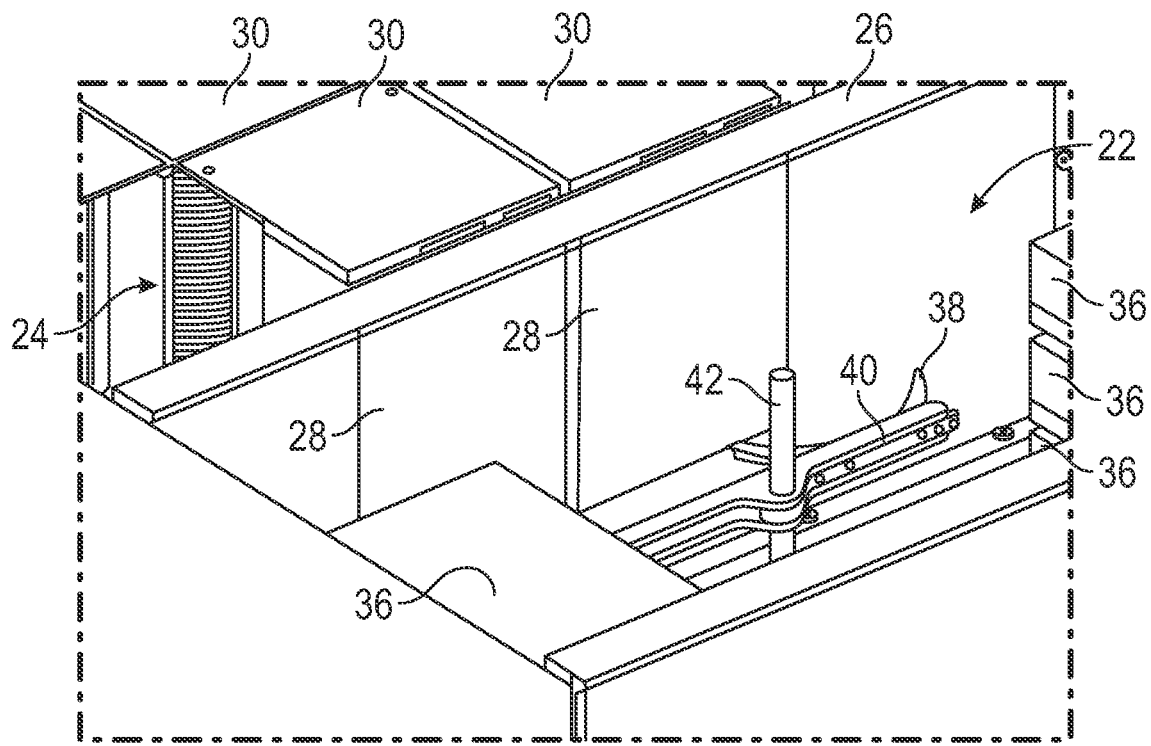
FIG. 2 is an enlarged view of a portion of FIG. 1 showing disk handling robotic structures.
Figure 3:
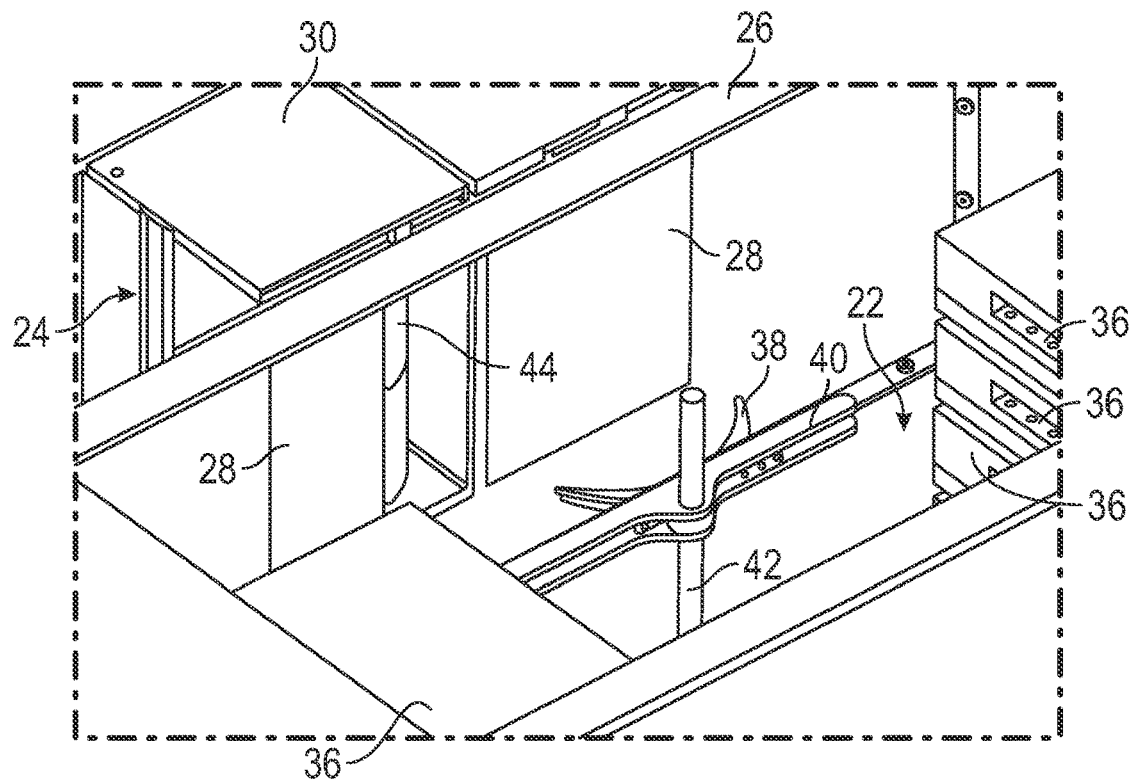
FIG. 3 shows an opening interlock door between the disk handling area and disk caddy storage area.

FIG. 2 shows an enlarged portion of FIG. 1, from a viewing angle that shows disk holder 38, which is slideably mounted on rail or guide 40. In an exemplary embodiment, disk holder 38 has an arcuate shape that is configured to attach to and release from an outer diameter of a data storage disk 46 (shown, for example, in FIG. 5). In exemplary embodiments, the disk holder 38 uses a grip or a vacuum to manipulate the disk 46. Rail 40 in an exemplary embodiment is pivotally mounted on shaft 42 for rotary motion about the shaft 42 and for vertical z-direction motion along the shaft 42.

Exemplary drivers for linear x-y direction motion of disk holder 38 along guide 40, and/or z direction linear motion of guide 40 along shaft 42, and/or x-y direction linear motion of disk handling robotic guide 76 along bearing rail 78 (shown in FIGS. 2-6), include a ball screw with an internal motor, a voice coil motor, an inchworm style crawler, a linear motor, a shape memory alloy based actuator, a piezoelectric actuator, and a combination of the above. Suitable rotary drivers or actuators that can be used for pivotal motion of rail 40 about shaft 42 include a micro-electromechanical system (MEMS) based actuator, or voice coil motor (VCM) based actuator, or piezoelectric actuator, for example.

As shown in FIG. 14, in an exemplary embodiment, a bank support assembly 32 is configured to support a bank of fifteen caddies 30, of which only three are shown so that the elements under the unillustrated caddies is visible. As shown in FIGS. 1, 13 and 15-17, an exemplary jukebox data storage system 20 has two banks of caddies arranged side-by-side. While the operation of a specific bank individually is shown and described with respect to FIG. 14, it is to be understood that the teachings herein can be expanded to banks of a different number and arrangement of caddies to thereby allow their motion in manners other than those explicitly illustrated.

In an exemplary embodiment, each caddy 30 holds a stack 44 of one hundred data storage disks 46. The disks 46 of each stack 44 are provided with vertical spacing therebetween to prevent contact between the disks and potential damage to the physical disks or the data contained thereon. In an exemplary embodiment, the spacing between the disks 46 of a stack is small, to increase data capacity in the jukebox system 20; each stack 44 has a high pitch that can be reliably handled by automation. In an exemplary embodiment, the caddies 30 are modular in that they are self-contained and easily interchangeable into and out of a jukebox system 20. As shown in FIG. 14, in an exemplary embodiment, each of the caddies has at least one open or openable side to allow for access of disk handling robotics to the disks 46 of a stack 44. One of the caddies 30 is shown without side walls 48 and with a transparent roof 50 so that stack 44 of data storage disks 46 is visible. However, it is to be understood that in an exemplary embodiment, all of the caddies 30 of the bank of caddies is similar so that they are modular in use and can be interchanged to provide for different data on the disks 46 to be housed in a particular jukebox data storage system 20. While only three caddies are illustrated in FIG. 14 so that underlying structures of the bank support assembly 32 can be seen, it is to be understood that in use, fifteen such caddies 30 would be provided on the bank support assembly 32. Moreover, in an exemplary embodiment, two such bank support assemblies 32 are provided in a library compartment 24, though other numbers of bank support assemblies 32 may be used.

While particular configurations and numbers of elements are illustrated in the exemplary embodiments, it is to be understood that more or fewer elements can be used than those explicitly described in this application. In another embodiment, each caddy 30 can include three immoveable side walls 48 and one moveable enclosure door, which can be closed when the particular caddy is not being accessed and open when the particular caddy 30 is presented to the disk handling compartment 22 at interlock 28. Enclosing a caddy 30 on all four sides when the disks are in storage and do not need to be accessed allows for a greater degree of control of an atmosphere inside the caddies 30, where the disks 46 reside. In an exemplary embodiment, enclosure door 52 (labeled in FIGS. 11 and 14) is provided as a semicircular shield that rotates in front of stack 44 to close the open side of the caddy 30 and rotates to a rear of caddy 30 (away from disk handling compartment 22) to allow access to the disks 46 of stack 44. Other forms of enclosure doors that can be opened and closed may be used.

In an exemplary embodiment, bank support assembly 32 includes two fixed longitudinally aligned bearing rails 54. Moveable bearing rails 56 are supported on turntables 58 to allow them to change in orientation from positions parallel to longitudinal rails 54 and perpendicular thereto, and vice versa. In an exemplary embodiment, each caddy 30 has a floor 60 that is pivotally connected to plate 62 so that the entire caddy can rotate about an axis 64 that is coincident with a center of the disk stack 44. In an exemplary embodiment, each plate 62 is bounded by fins or rails on a bottom side thereof that fits between each set of large roller 66 and small roller 68, wherein at least one of the rollers 66, 68 is driven by roller motor 70. In an exemplary embodiment, a roller motor 70 is provided for each of sets of large and small rollers 66, 68. As the motors 70 turn the rollers 66, 68, the fin on the bottom of plate 62 is fed between the sets of rollers 66, 68 to move the attached caddies 30 along bearing rails 54, 56. When a caddy reaches turntable 58, rotary motors 72 turn the turntables 58 to align the moveable bearing rails 56 in a desired direction for caddy motion. The action and direction of roller motors 70 and rotary motors 72 are controlled by motor drivers 74.

In an exemplary embodiment, an orientation of each of the caddies 30 stays consistent, even if the plate 62 thereunder turns direction, such as by action on turntable 58. For example, as shown on the left side of FIG. 14, two caddies are shown on the closest bearing rail 54 to a viewer. In the illustrated embodiment, the right most caddy is shown with transparent walls. The left most of those two caddies has an open side facing interlock 28 for accessibility to disks 46 of stack 44 by the disk handling robotic assembly. The moveable bearing rail 56 under this caddy is aligned longitudinally with the fixed longitudinal bearing rail 54. The neighboring turntable 58 however has a moveable bearing rail 56 aligned perpendicular to the moveable bearing rail 56 underlying the caddy. Even when the turntable 58 under the caddy is rotated to align the two moveable bearing rails 56 so that the caddy 30 can move across them (as shown on the right side of FIG. 14 at the two turntables 58), the orientation of the caddy 30 and its open face does not change. This is made possible by a pivoting connection between plate 62 and the floor 60 of each caddy 30, allowing the plate 62 to turn with the turntable 58 while maintaining a fixed orientation of the caddies 30 within the library compartment 24. Thus, in an embodiment where one side wall 48 of caddy 30 is omitted or is provided with an openable enclosure, a consistent open side of the caddy is presented to the disk handling compartment 22. While a motor driven system for the caddy motion is illustrated and described, it is to be understood that other motive sources can also be used, such as an electromagnetic drive, for example.

Returning to FIG. 3, as a selected caddy 30 of the library compartment 24 is moved into position to be accessed by the disk handling robotics of disk handling compartment 22, interlock 28 opens, as by sliding for example, to allow disk holder 38 to access a disk 46 of stack 44. As shown in a comparison of FIGS. 2 and 3, in an embodiment, the disk holder 38 slides linearly along rail 40 to an x-y direction position aligned with the disk stack 44. Rail 40 also slides linearly along shaft 42 in a z direction to align with a particular disk 46 of the stack 44 (shown in FIG. 5).

Figure 4:
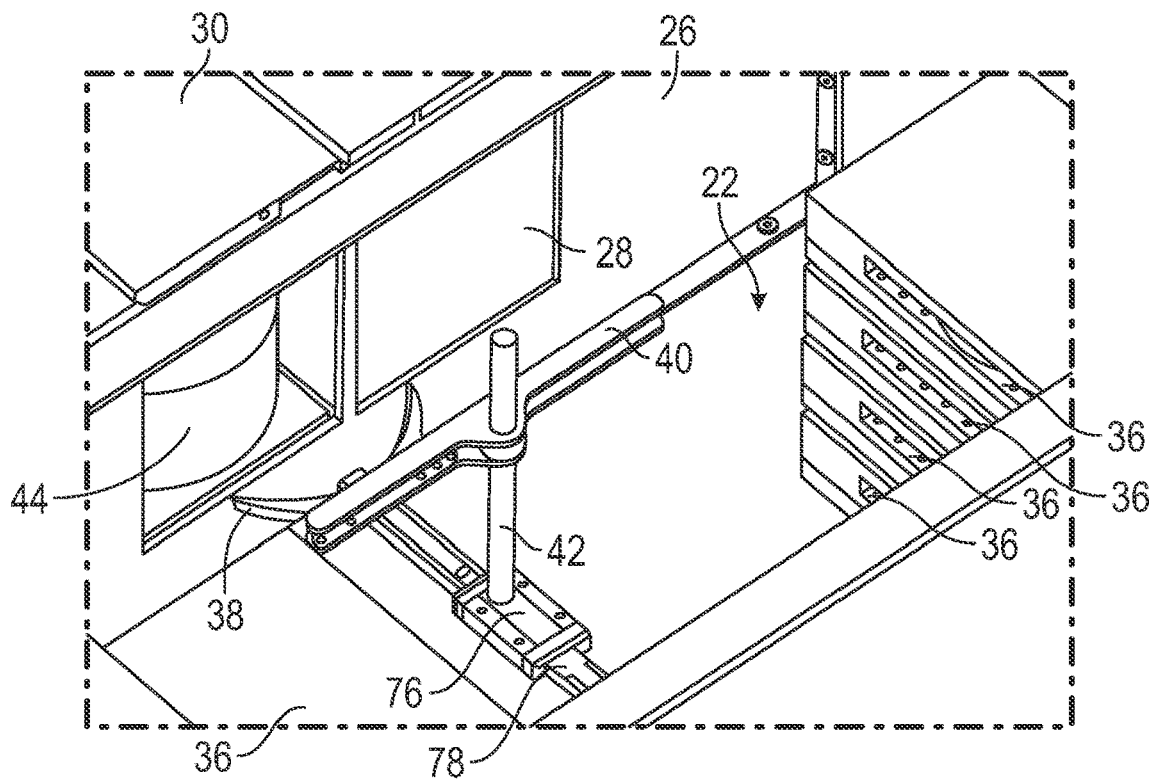
FIG. 4 shows a disk holder advancing toward a disk of the caddy that is now open to the disk handling area.

As shown in FIG. 4, once in the desired position along rail 40, shaft 42, mounted on a guide 76, slides toward the disk stack 44 along bearing rail 78. The illustrated disk handling robotic assembly includes disk holder 38, rail 40, shaft 42, guide 76 and bearing rail 78. However, different disk handling robotic assemblies could be used in the data storage system 20. Moreover, while particular numbers and depictions of components are provided, it is to be understood that other equivalent components or different numbers of components can be used. For example, FIG. 4 shows a single disk handling robotic assembly that is moveable between two positions of selectively openable interlocks 28. However, in another embodiment, two sets of disk handling robotic structures can be provided, one for each of the interlocks 28. Moreover, the exemplary embodiments have eight disk players 36, arranged in two vertical stacks of four players 36. However, other numbers of disk players 36 can be provided in arrangements other than described. Additionally, the disk players 36 are illustrated as being contained within the disk handling compartment 22. In other embodiments, a disk player 36 may reside outside of the disk handling compartment 22, with only an access aperture provided for insertion of a disk 46 from the disk handling compartment 22 into a disk player 36. Such an aperture could be a slot in a wall of the disk handling compartment 22, for example.

Figure 5:
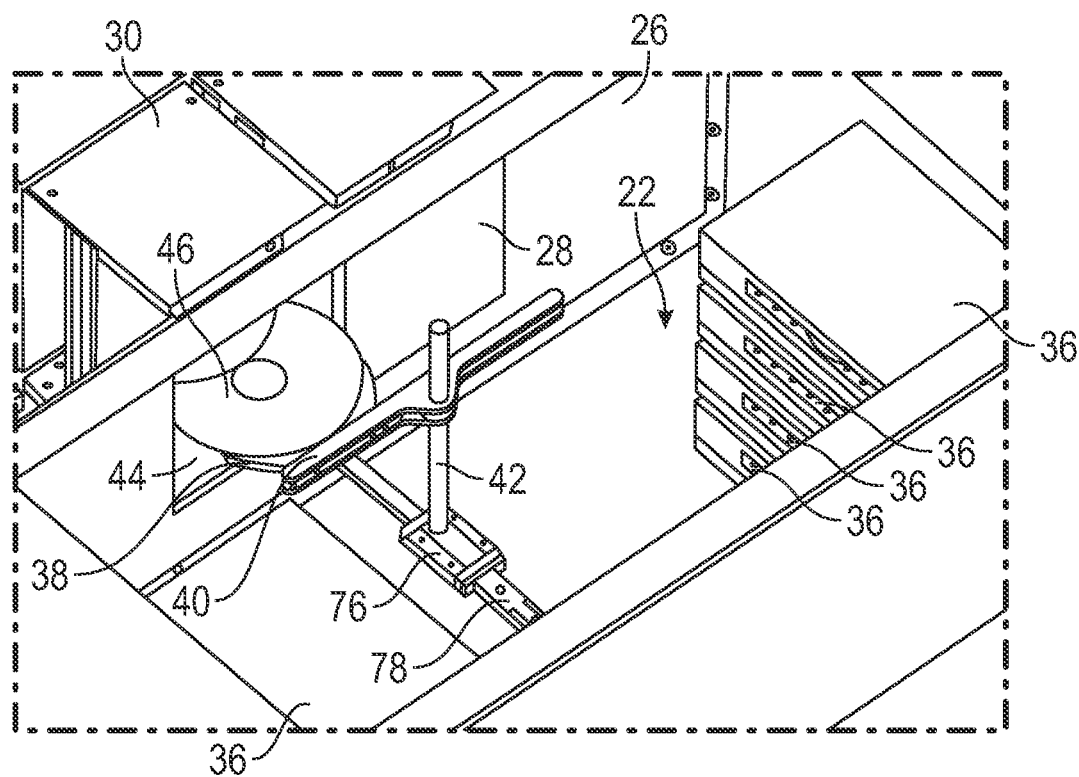
FIG. 5 shows the disk holder obtaining one disk from the stack of disks of the open caddy.
Figure 6:
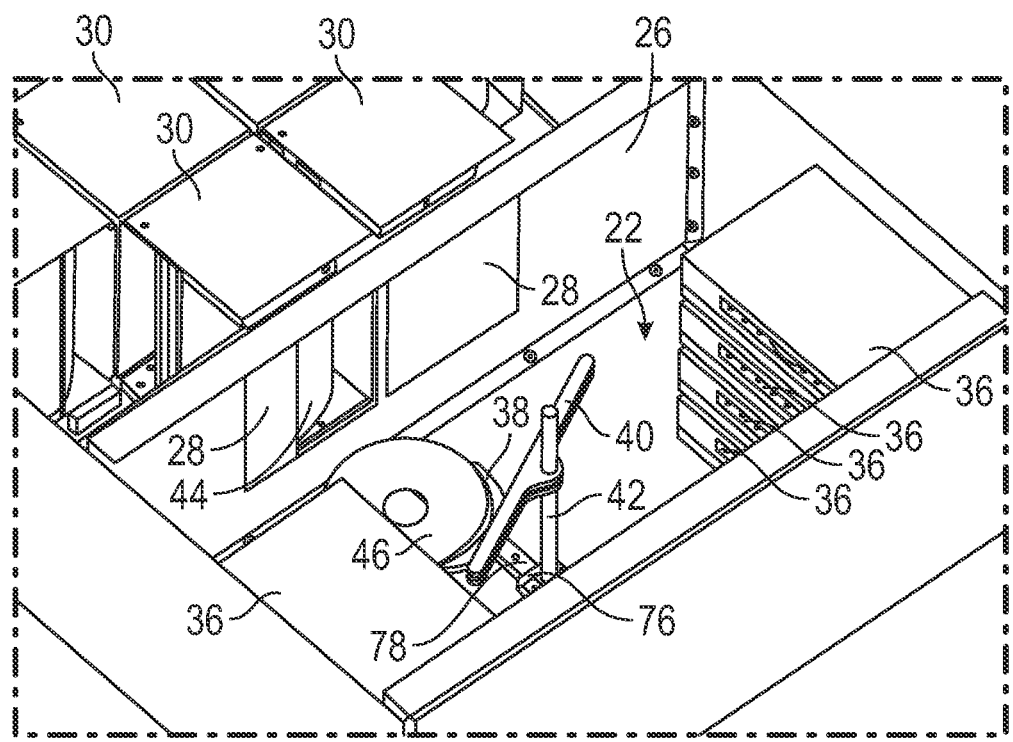
FIG. 6 shows the interlock door between the disk handling area and the caddy closing as the disk holder pivots to position the disk for insertion into a disk player.
Figure 7:
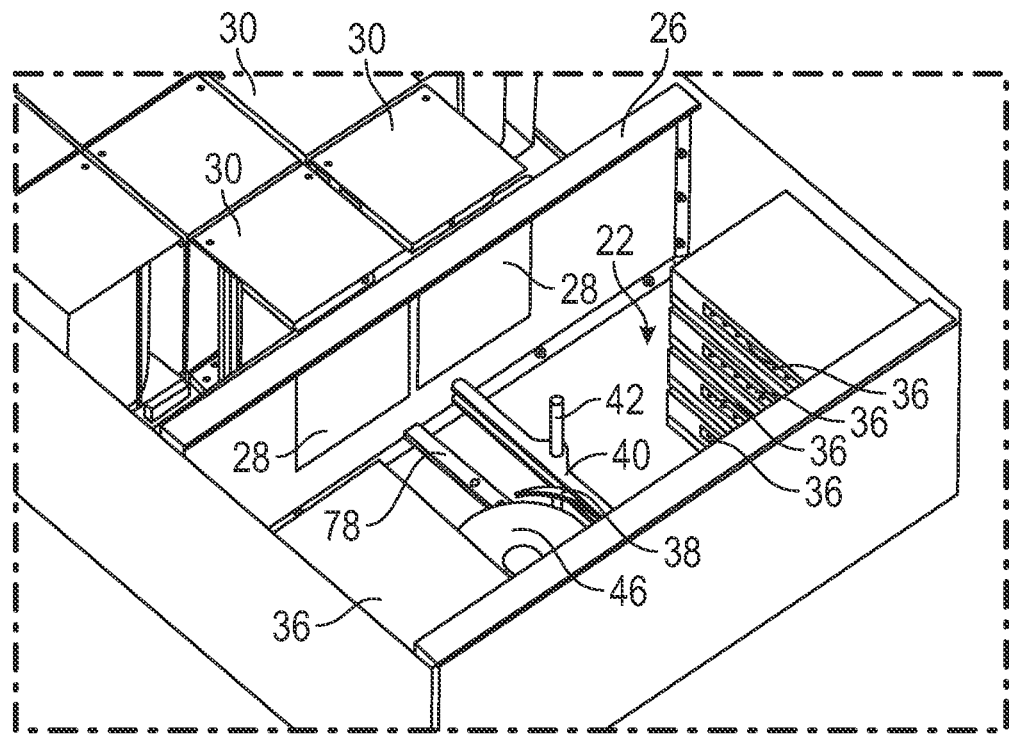
FIG. 7 shows the disk being inserted into a player.

As shown in FIG. 5, the disk holder 38 has obtained a selected disk 46 from the stack 44. As shown in FIG. 6, once the disk 46 has cleared the partition 26, interlock 28 can close to thereby maintain the controlled atmosphere inside disk handling compartment 22 and/or library compartment 24. As shown in FIGS. 6 and 7, guide 76 of the disk handling robotic assembly slides on bearing rail 78. Rail 40 pivots about shaft 42 to position disk 46 in alignment with a disk acceptance slot of player 36. Disk holder 38 and the attached rail 40 are also capable of moving up and down the shaft 42 in the z direction to position the disk 46 at a suitable height for a selected player 36. As shown in FIG. 7, once aligned with an entry slot of a suitable player 36, the disk 46 is inserted into the player.

Figure 20:
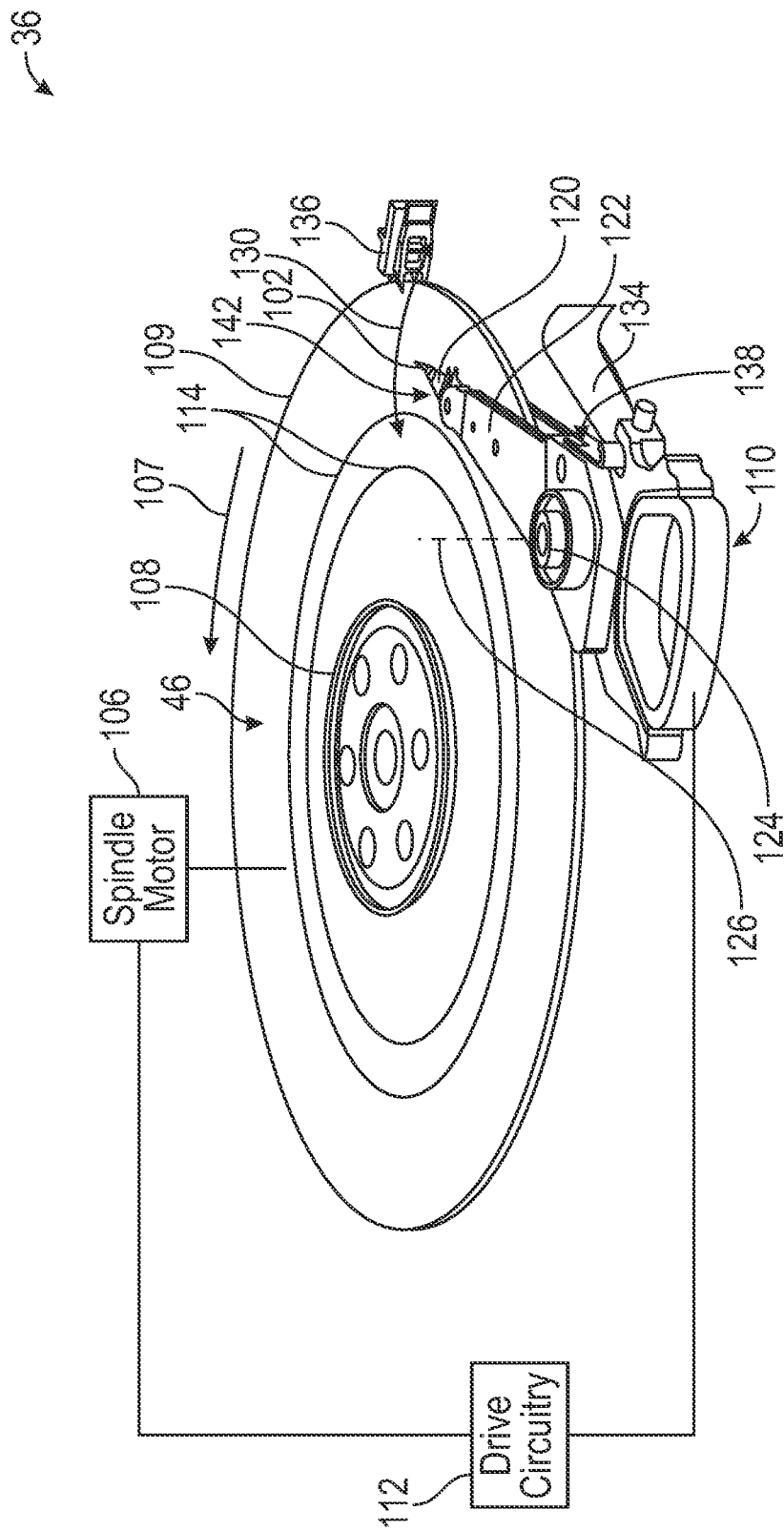
FIG. 20 is a perspective diagram of an exemplary disk player.

FIG. 20 shows an illustrative operating environment of a suitable player 36. Embodiments of the present disclosure are not limited to any particular disk player and can be practiced with any number of different types of reading and writing devices for data storage disks. In exemplary player 36, head(s) 102 may be positioned over and/or under storage media disk 46 to read data from and/or write data to the disk. For read and write operations, a spindle motor 106 (illustrated schematically) rotates the disk 46 as illustrated by arrow 107 and an actuator mechanism 110 positions the head(s) 102 relative to data tracks 114 on the rotating disk 46 between an inner diameter (ID) 108 and an outer diameter (OD) 109. Both the spindle motor 106 and actuator mechanism 110 are connected to and operated through drive circuitry 112 (schematically shown). Each of heads 102 is coupled to the actuator mechanism 110 through a suspension assembly that includes a load beam 120 connected to an actuator arm assembly 122 of the mechanism 110 for example through a swage connection. The actuator mechanism 110 is rotationally coupled to a frame or deck (not shown) through a bearing 124 to rotate about axis 126. Rotation of the actuator mechanism 110 moves the heads 102 in a cross-track direction as illustrated by arrow 130. Each of the heads 102 includes one or more transducer elements (not shown) coupled to head circuitry through flex circuit 134.

In general, in order to keep read/write heads 102 from landing on disk 46 in player 36 when, for example, power is removed from the player 36, and to prevent the head(s) 102 from colliding with outer edges of the disk 46 during load and unload operations, a head support ramp assembly 136 is provided adjacent to the OD 109 of the disk 46. The actuator mechanism 110, the load beams 120 and the actuator arms 122 are collectively referred to as the head stack assembly (HSA) 138. The exemplary embodiment illustrated in FIG. 20 shows an actuator arm 122 with upper and lower plates, each carrying a head 102. Thus, the upper head 102 reads/writes data from/to the upper surface of disk 46, and the lower head 102 reads/writes data from/to the lower surface of disk 46. In another embodiment, the disk player 36 may be configured with a different arrangement and number of heads 102 to interact with one or more disks. For example, a disk player 36 may have only one head 102; in that case, the disk handler can be configured to flip the disk 46 to allow a single head 102 to access both disk data surfaces.

Figure 8:
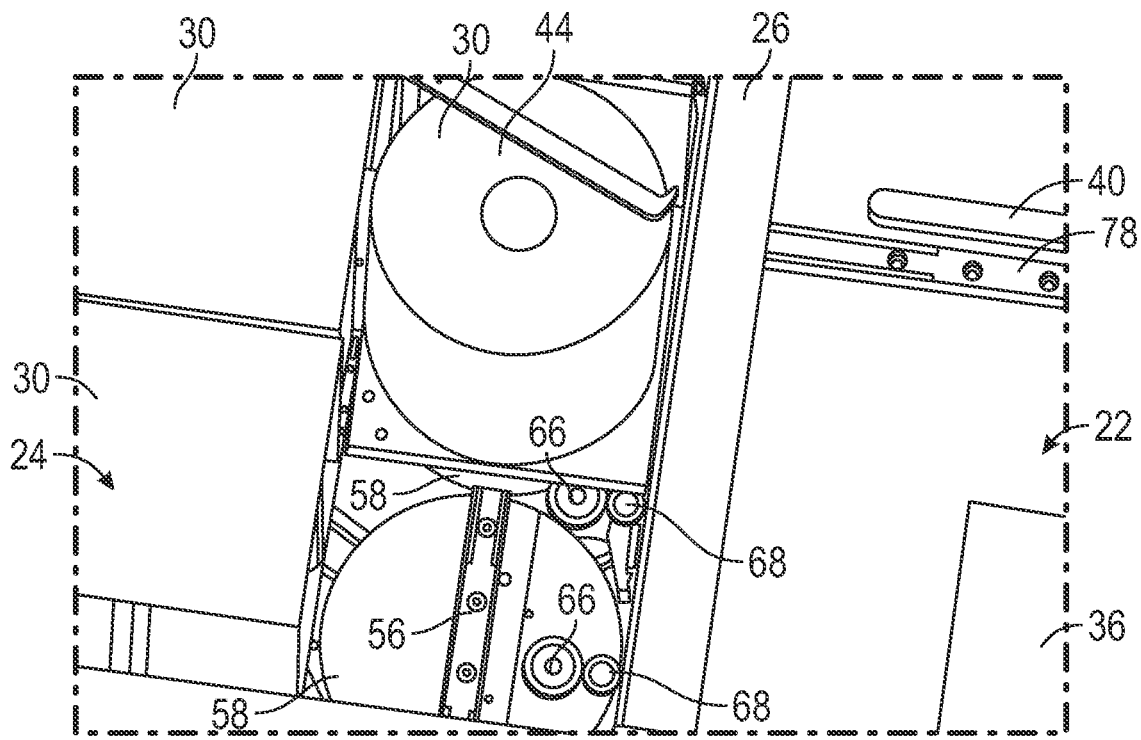
FIG. 8 is an enlarged view of a portion of the system of FIG. 7, with the caddy cover removed.

Referring to FIG. 8, in an operation in which the next disk to be handled by the disk handling robotic assembly is not in position at partition 26, the caddies 30 in the library compartment 24 are moved along moveable bearing rails 56 and fixed longitudinal bearing rails 54 to present another caddy 30 at the interlock 28. FIG. 8 shows two turntables 58, one with a caddy 30 thereon. That caddy has its cover shown as translucent so that the stack 44 of disks therein is visible.

Figure 9:
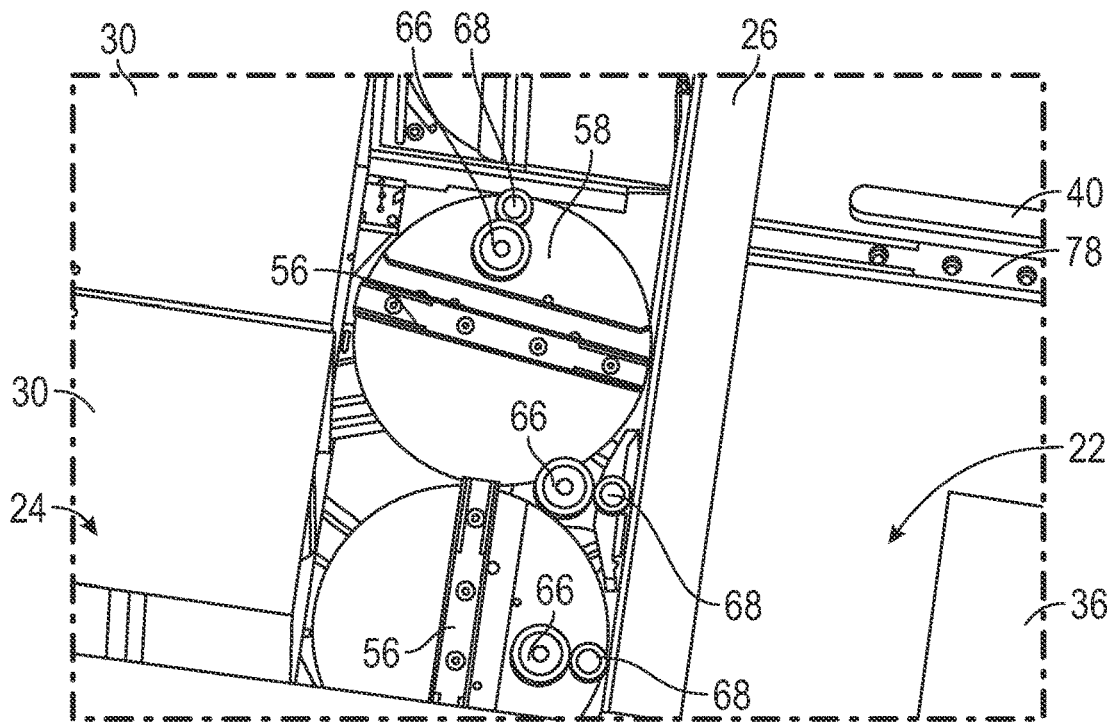
FIG. 9 is similar to FIG. 8 but removes the disk stack so that a rotating turntable under the stack is visible.
Figure 10:
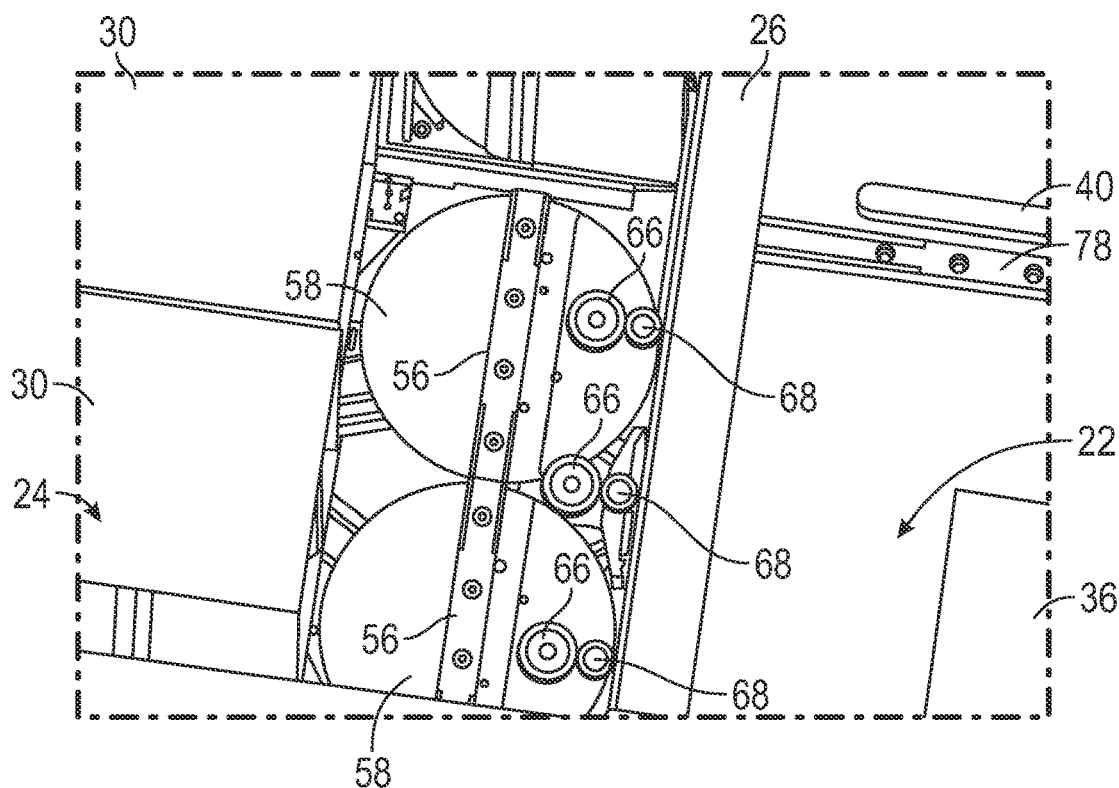
FIG. 10 shows rotation of the turntable to change a direction of caddy motion.
Figure 11:
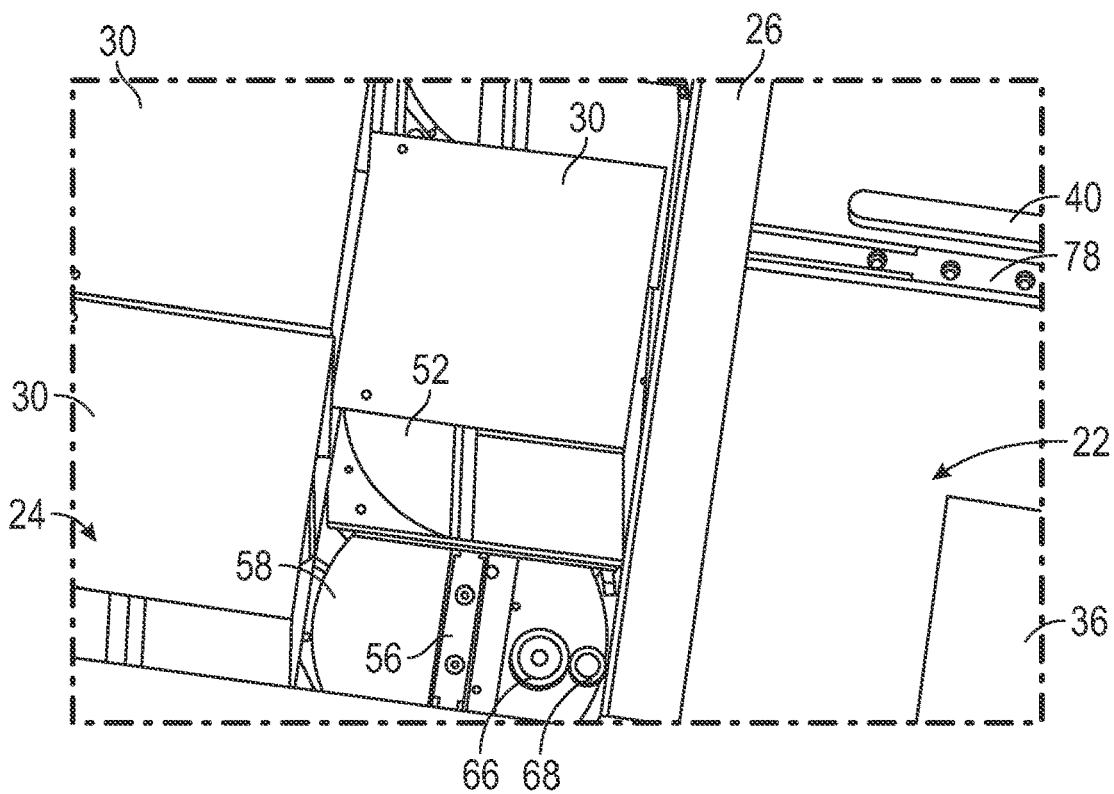
FIG. 11 shows the caddy moving along the aligned guiderails of adjacent turntables.
Figure 12:
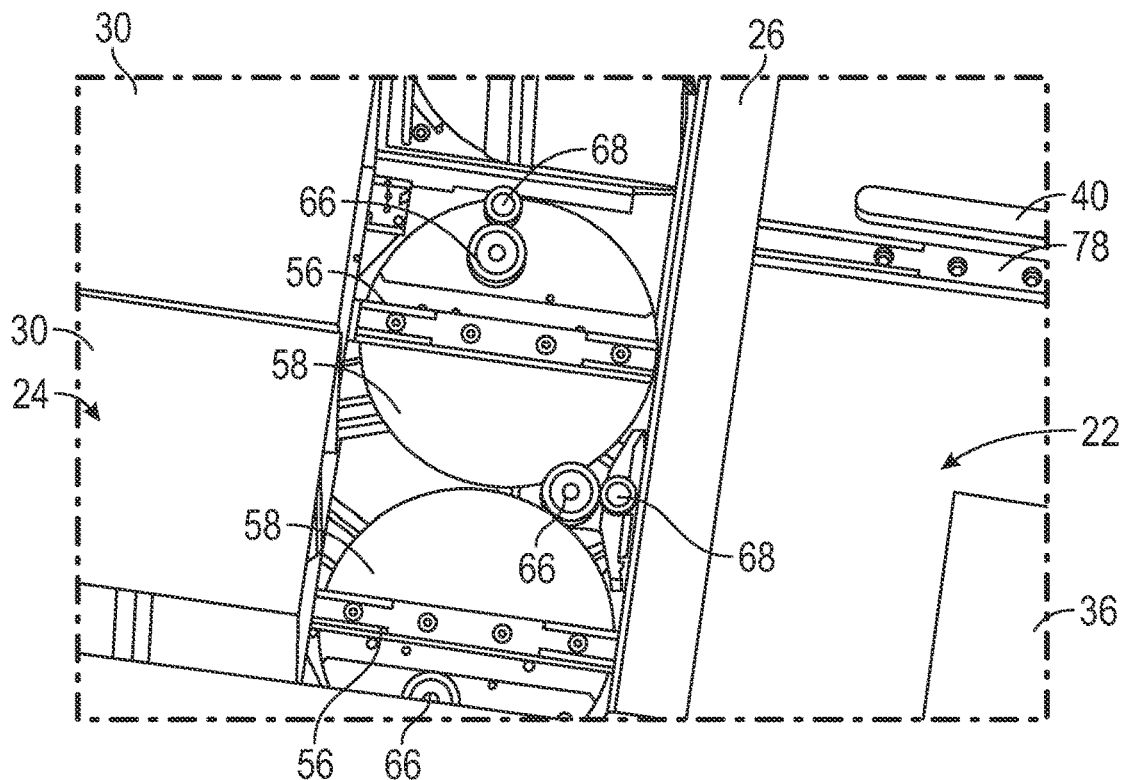
FIG. 12 shows two adjacent caddy support plates without caddies thereon, wherein the plates have been rotated 90 degrees relative to their positions in FIG. 10, to facilitate caddy motion in a longitudinal direction of the jukebox enclosure.

As shown in FIGS. 9, 10 and 12, that caddy is entirely removed so that the turntable 58 and its structures underneath the caddy are visible. As shown in FIGS. 9 and 10, the turntable 58 under the caddy rotates under the motive of rotary motor 72 (shown in FIG. 14) to align the moveable bearing rail 56 with that of the adjacent turntable 58. As shown in FIG. 11, the caddy 30 is then moved away from interlock 28 along the guide or bearing rail 56, as a fin or rail of plate 62 under the caddy 30 is pushed through the sets of rollers 66, 68 by the rollers, which are driven by roller motors 70 (shown in FIG. 14).

Figure 13:
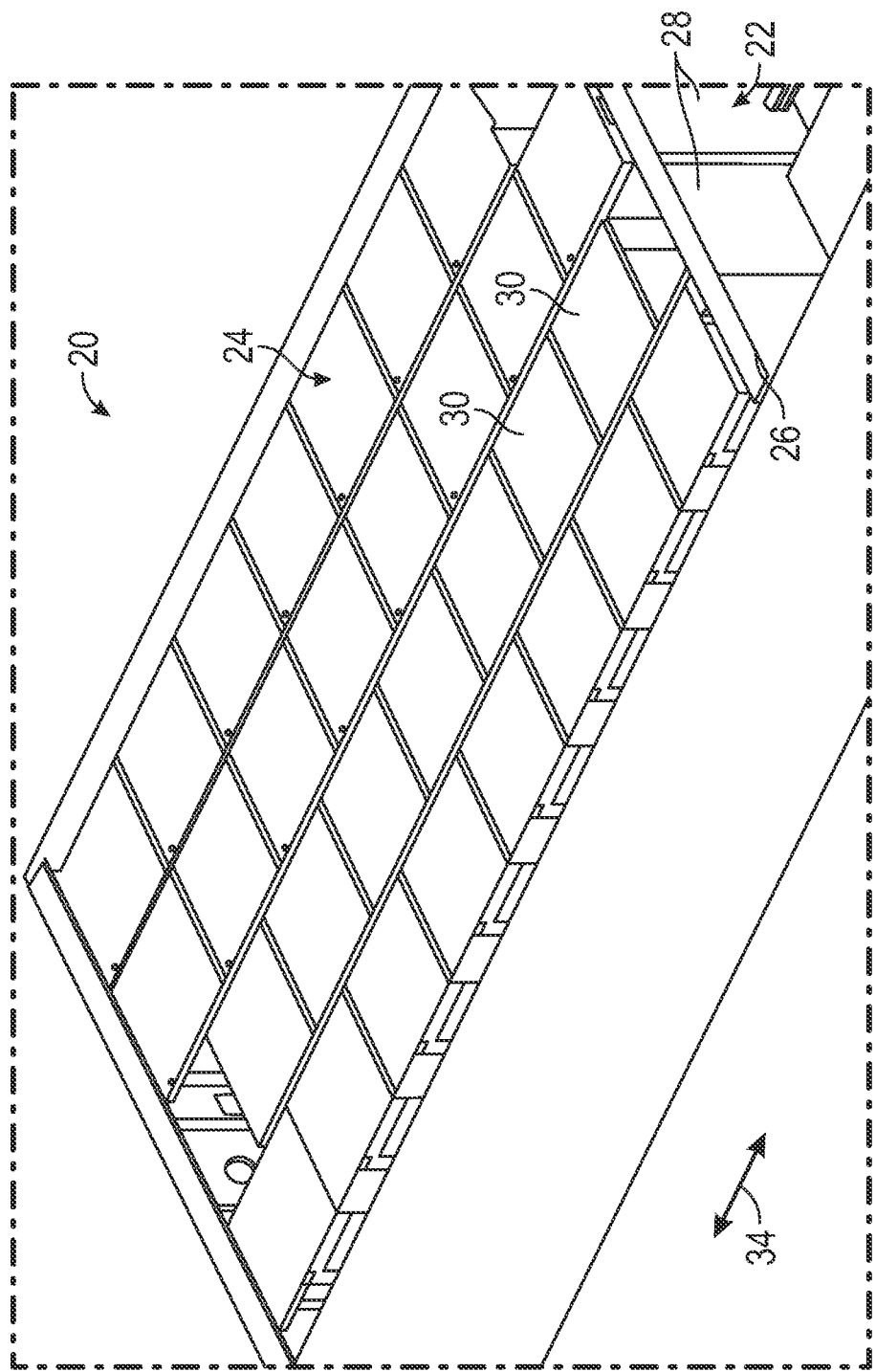
FIG. 13 shows the longitudinal displacement of one row of caddies relative to the configuration shown in FIG. 1.

As shown in FIG. 12, to move another caddy 30 toward the interlock 28, the turntables 58 are rotated in order to align the moveable bearing rails 56 with the fixed longitudinal bearing rails 54. Again, the rotation of the turntables 58 is accomplished by the rotary motors 72 (shown in FIG. 14). FIG. 13 shows the movement of a row of caddies 30 along the longitudinal extent 34, along the fixed longitudinal bearing rail 54 and moveable bearing rail 56 in the second row of caddies from the viewer.

Figure 15:
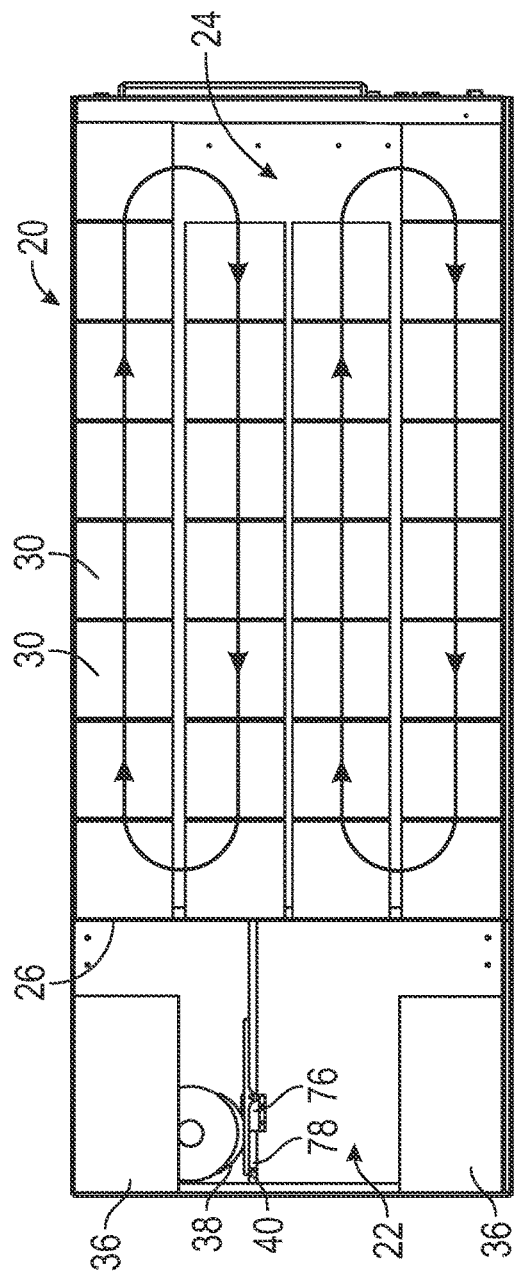
FIG. 15 is a plan view of an exemplary jukebox data storage system with two caddy transport systems, showing one example of possible rail motion.
Figure 16:
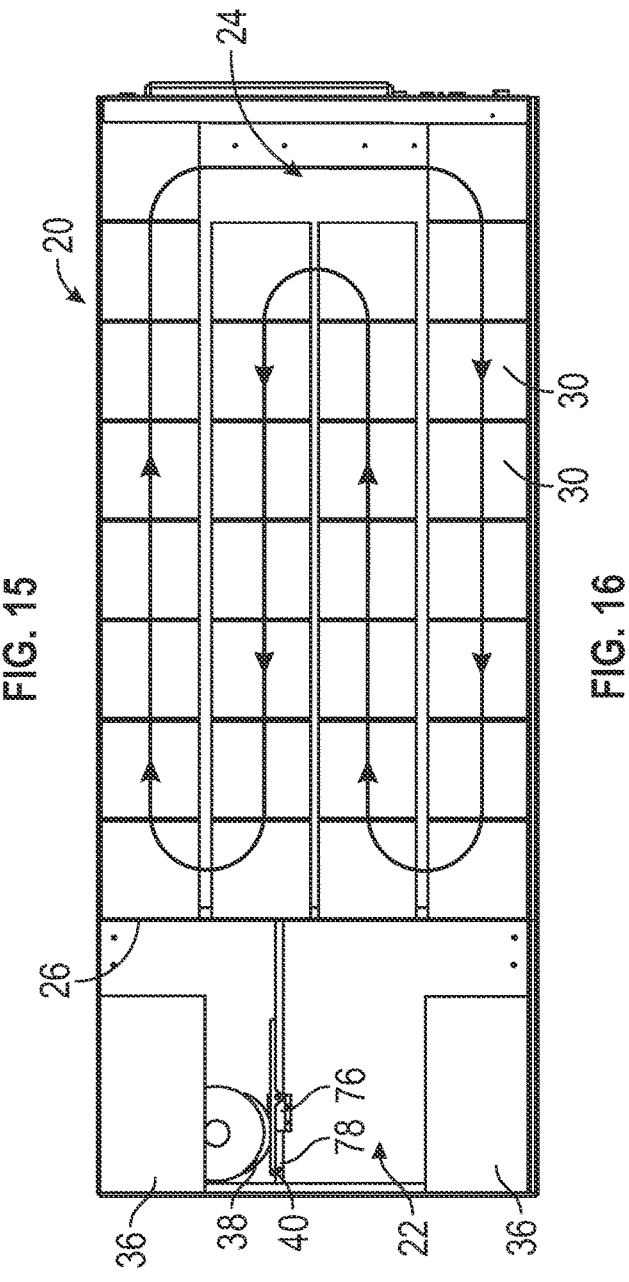
FIG. 16 is a plan view of an exemplary jukebox data storage system showing a second example of possible rail motion.

FIGS. 15 and 16 are top plan views showing exemplary caddy travel patterns within the library compartment 24. However, it is to be understood that other motion patterns can also be utilized, with changes in the placement of turntables 58 in the bank support assembly 32 as needed to affect the desired motions.

Figure 17:
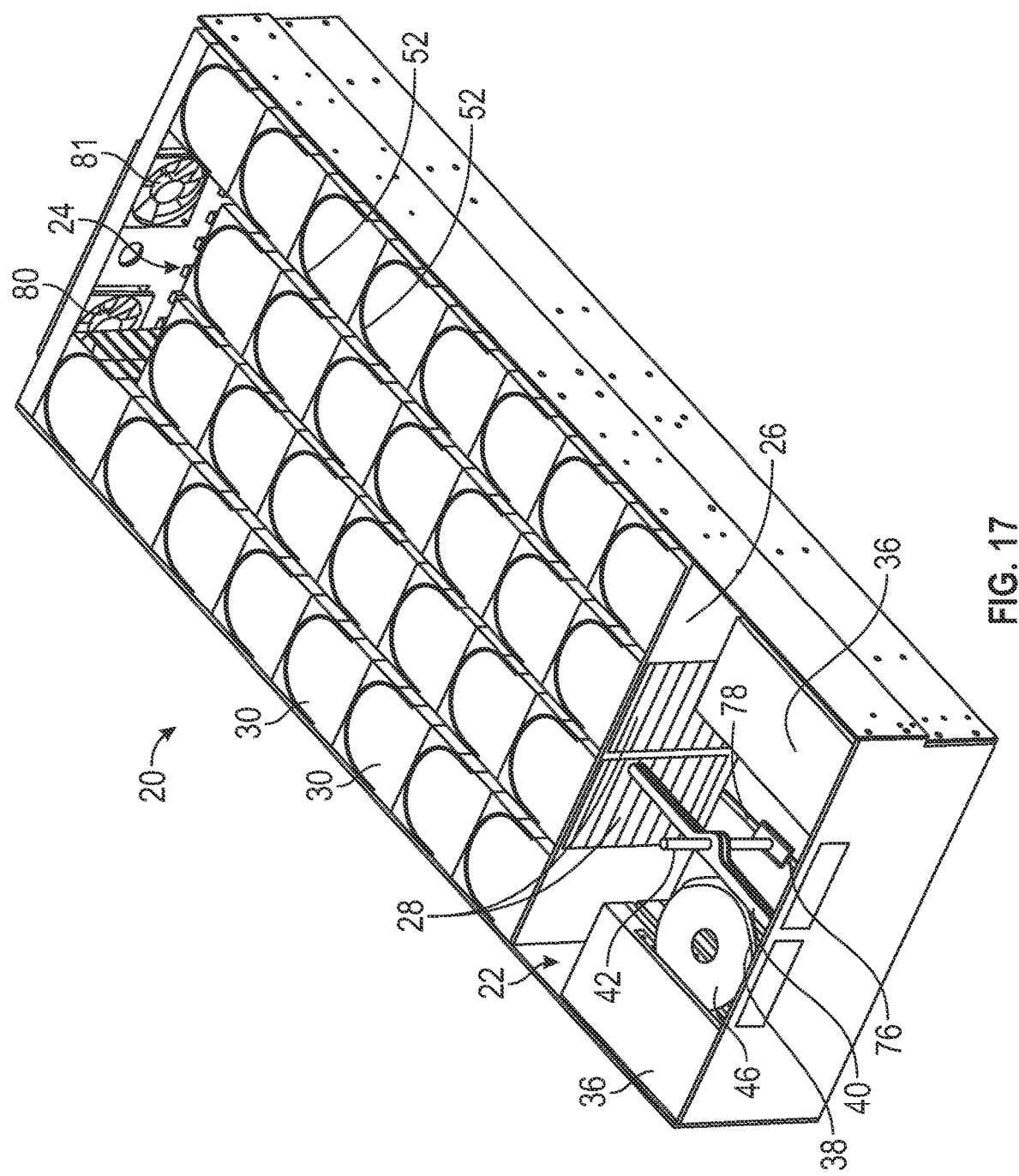
FIG. 17 is a perspective view of an exemplary jukebox data storage system showing exemplary gas inlets.

FIG. 17 is a perspective view of an exemplary jukebox data storage system 20 wherein a wall thereof includes a fluid inlet 80 and fluid outlet 81. The fluid is typically gaseous but is not limited to a gas. While not explicitly illustrated, in an exemplary embodiment, each player 36 (or a set of players 36), disk handling compartment 22 and library compartment 24 has a fluid inlet connected to gas generator 84 and/or the ambient atmosphere. Additionally or alternatively, each of those areas 36, 22, 24 also has a fluid outlet connected to vacuum source 86 and/or the ambient atmosphere. These inlets and outlets can be provided on any wall or partition of the system 20, to allow for atmospheric management in any or all of the disk handling compartment 22, library compartment 24, disk players 36 or other areas.

Figure 18:
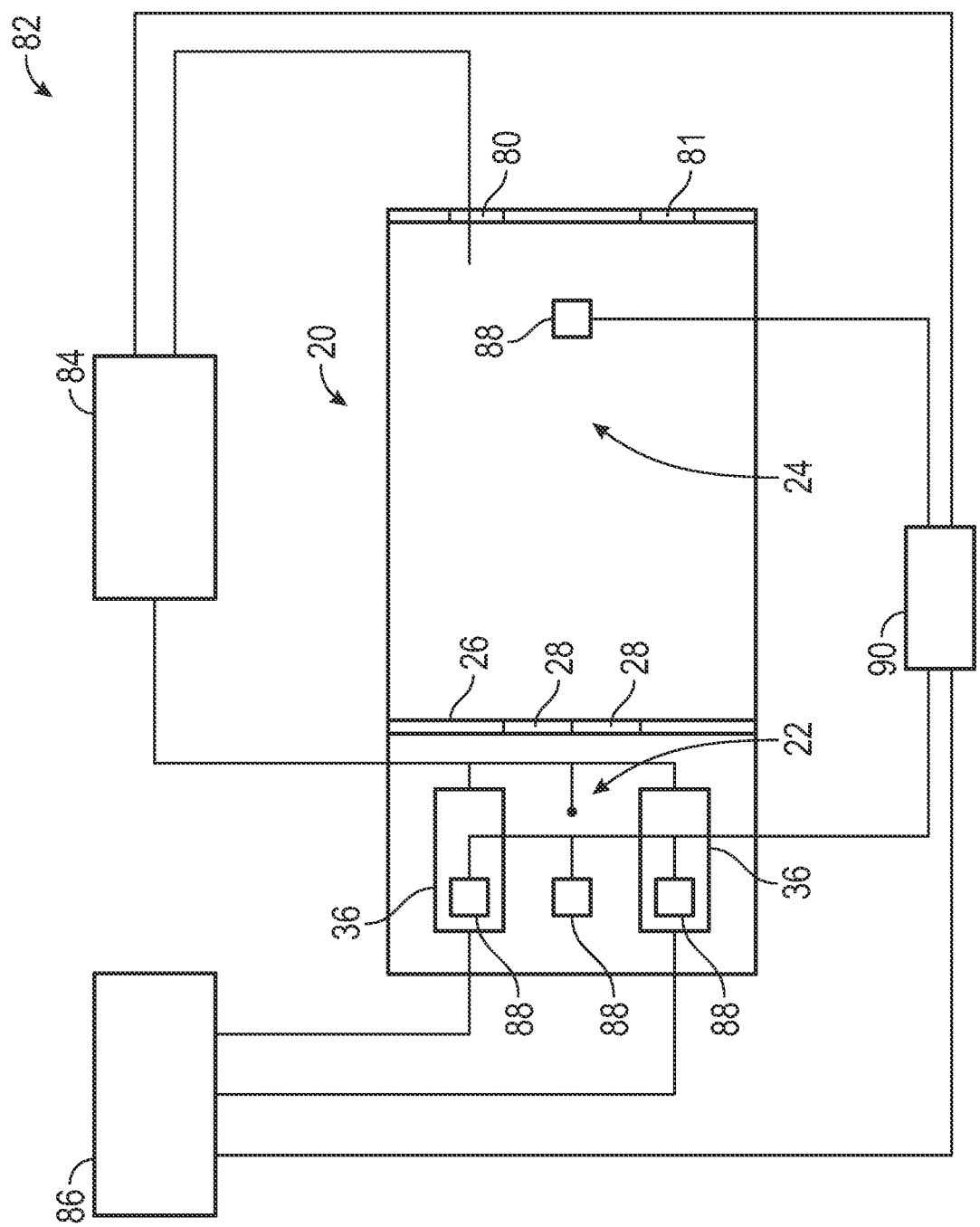
FIG. 18 is a diagram of an exemplary inert environment generation system for use with a jukebox data storage system.

FIG. 18 is a schematic diagram of a fluid control system 82 for the jukebox data storage system 20. In an exemplary embodiment, a gas generator 84 is fluidly coupled to one or more of the disk handling compartment 22 and the library compartment 24, such as through inlet 80, to provide a gas environment within the enclosed data storage system 20 that is other than ambient air at atmospheric pressure. In one example, the gas environment may have the same composition as ambient air but at a different pressure or density. In another example, the gas environment may have the same pressure as outside air but a different composition. In yet another example, the gas environment may have a different composition and a different pressure compared to outside air. While the illustrated embodiments show the jukebox data storage system 20 without a cover so that components are visible, it is to be understood that in operation, the system 20 would be enclosed within a housing with only controlled gas exchange between interior and exterior compartments as explained herein. In an exemplary embodiment, gas generator 84 generates a particular type of gas and supplies it continuously or in a controlled manner to disk handling compartment 22 and/or library compartment 24. In an exemplary embodiment, generator 84 produces nearly pure nitrogen gas from the ambient air and funnels it into disk handling compartment 22. The gas is initially supplied to the disk handling compartment 22 at a positive pressure to displace air therein and inject the nitrogen.

An inert atmosphere that is less reactive with head components than readily available air helps to prolong the useful life of data reading and writing heads, such as by oxidation reduction. While several inert, non-reactive gasses are suitable, nitrogen gas is used in an exemplary embodiment because of its natural abundance in air. Other gases and combinations thereof can also be used. For example, helium and argon can also be used, as well as blends of nitrogen, helium and argon.

A suitable generator 84 is available from Hitachi Industrial Equipment Systems Company, Limited, as a pressure swing absorption (PSA) nitrogen generator. Such a generator is capable of producing nearly pure nitrogen (about 99.8 percent) from ambient air. Power consumption used by the generator 84 can be reduced by minimizing fluid leakage between the compartments of the storage system 20. Thus, in the exemplary embodiment, fluid flow is controlled by interlocks 28 that are selectively operable as described. Moreover, similar interlock can be provided between the main disk handling compartment 22 and the interior of each player 36.

In an exemplary embodiment, fluid pressure in disk handling compartment 22 is maintained at a positive pressure (such as 1.2 atmosphere, for example) to ensure maintenance of the nitrogen environment and prevent leaking of air or other gas into the disk handling compartment 22.

In an exemplary embodiment, the library compartment 24 may contain atmospheric air or a modified fluid environment including the injection of nitrogen or other gas or combinations thereof. Because the library compartment 24 contains disks but no disk reading or writing heads, its environment need not be as closely controlled as the environment in disk handling compartment 22. Thus, it may be suitable to have the library compartment 24 at an unmodified atmospheric pressure (at 1.0 atmosphere, for example).

In an exemplary embodiment, a vacuum source 86 is fluidly connected to the disk players 36 to lower the pressure of nitrogen or other gas within the players 36. This is because the players constitute the areas of the disk storage system 20 where particulate generation is most likely in the event of a crash or other contaminant generating event. Thus, in an exemplary embodiment, an environment within each of the players 36 has a fluid composition of nearly pure nitrogen, but at a lower pressure of 0.9 atmosphere, for example. Negative pressure in the player 36 also reduces fluid friction and density, thereby improving performance and reducing power consumption. Vacuum source 86 is illustrated as being fluidly connected to players 36 because those compartments may benefit most from an environment having lower than atmospheric pressure; however, a vacuum source may be fluidly coupled or connected to any part of data storage system 20, including other areas of the disk handling compartment 22 and/or the library compartment 24. Vacuum pressure can also be used to maintain the disk 46 in a desired position; for example, by the player 36 when spinning or by the disk handler when holding onto and maneuvering the disk 46.

In an exemplary embodiment, fluid control system includes sensors 88 in signal communication with controller 90. Sensor 88 include one or more of pressure sensors, gas composition/purity sensors, and particle counters, for example. In the illustrated embodiments, sensor 88 is provided in each of disk handling compartment 22, library compartment 24, and each player 36. If a sensor 88 detects that the environment of any of these enclosures has too low of pressure or not enough gas, the signal is sent to controller 90, which actuates generator 84 to produce more gas and direct it to the affected area(s). If a sensor 88 detects that pressure in a player 36 is too high, the signal is sent to controller 90, which actuates vacuum source 86 to pull gas out of the affected area(s). Controller 90 can also be programmed and accept user commands to move caddies 30 on bank support assemblies 32, operate the disk handling robotic assembly, and open and close interlocks 28, among other tasks.

Different pressure gradients can be used in fluidly isolated zones of the data storage system 20 to limit the spread of contamination and particulate material while funneling an inert environment of gas to components that will most benefit from the generated fluid. Control system 82 includes generator 84 that can continuously supply an inert gas to the data storage system 20 to easily replenish any lost gas and thereby maintain a non-reactive environment. While fluid control system 82 is illustrated with a gas generator 84 for a single data storage system 20, it is contemplated that such a gas generator 84 could be shared between multiple data storage systems 20. Moreover, while a single gas generator 84 is illustrated, it is contemplated that multiple gas generators may be used, such as in a case where a combination of different types of gasses is desired. Additionally, fluid control system 82 can also control ingress and egress of ambient air into and out of any area of the data storage system 20.

Figure 19:
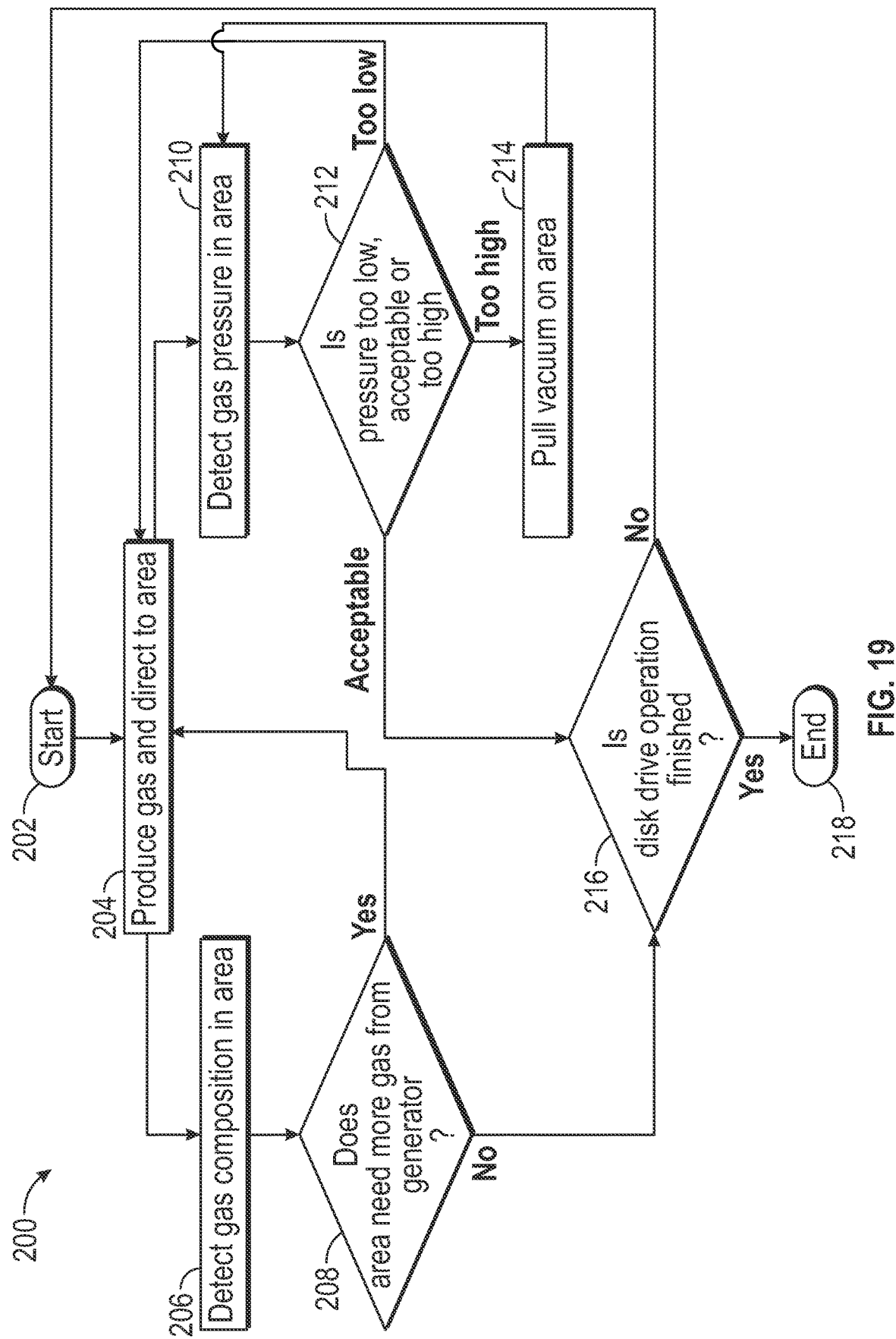
FIG. 19 is a flow chart showing an exemplary method of use of the inert environment generation system.

FIG. 19 is a flow chart illustrating an exemplary method 200 of using a fluid control system 82, which starts at 202. At 204, gas is produced by generator 84 and directed to an area, such as player 36, disk handling compartment 22 and/or library compartment 24. At 206, sensor 88 detects a gas composition and/or particle numbers in the respective player 36, disk handling compartment 22 and/or library compartment 24 and sends a signal to controller 90. At 208, controller 90 determines whether the detected composition is adequate or whether additional gas from generator 84 is warranted. For example, if particle counts are too high, a gas outlet such as outlet 81 may be opened to allow the contaminated gas to exit and permit it to be replaced with generated gas. In another example, a gas purity sensor may determine, for example, that a purity of nitrogen is not within a desired level range; in that case, existing gas in an area may be exhausted, so it can be replaced with generated gas. If more gas is desired, the method returns to 204. Additionally or alternatively, the affected chamber can be sealed or enclosed, and the system can sound an alarm or otherwise raise an alert for user intervention and maintenance. If the gas composition is adequate, the method continues to query 216.

In parallel or in series with the above described steps, at 210, sensor 88 detects a gas pressure in the respective player 36, disk handling compartment 22 and/or library compartment 24 and sends a signal to controller 90. At 212, controller 90 determines whether the detected gas pressure is too low, too high, or acceptable. If the gas pressure is too low, the method returns to 204 to add generated gas. If the gas pressure is too high, gas is pulled out of the affected compartment(s) at 214. If the gas composition is adequate, the method continues to query 216.

Query 216 asks if the operation of data storage system 20 is complete. If not, the method returns to start at 202. If so, the method ends at 218. The method may be repeated for each area (such as player 36, disk handling compartment 22 and/or library compartment 24) having a modified (non-air and/or non-atmospheric pressure) environment for a particular use of the data storage system. Moreover, the system components may be modified for more specific or less specific control; for example, monitoring and modifying the environment for each player 36 individually or each caddy 30 individually, or for sub-sets of players or caddies. The repetition of gas generation, monitoring and controlling steps may be performed on a substantially continuous basis during operation of the data storage system 20. Alternatively, to save on power consumption, the steps may be implemented at intervals based on time, read/write operations, or other factors. For example, a user may wish to have different levels of timing for different areas. For example, the system may be configured so that when a disk is spinning, the gas environment in the player is sampled more often than when the disk is not spinning. The method may also be implemented by more than one gas generator, in a case in which gas with more than one produced component is desired.

Non-limiting examples of system and methods are described. An exemplary system 82 comprises a library compartment 24 housing a plurality of data storage disks 46; a player 36 comprising a head 102 that is configured to interact with at least one of the plurality of data storage disks 46; a partition 26 between the library compartment 24 and the player 36 comprising a selectively openable interlock 28; and a gas generator 84 configured to supply gas to the player 36. The player 36 has a negative fluid pressure relative to the library compartment 24.

In an exemplary embodiment, the player 36 has a different gas environment composition than the library compartment (such as a higher concentration of nitrogen, for example). In an exemplary embodiment, a disk handling compartment 22 contains the player 36. In an exemplary embodiment, the player 36 has a negative fluid pressure relative to the disk handling compartment 22. In an exemplary embodiment, the disk handling compartment 22 has a positive pressure relative to the library compartment 24.

In an exemplary embodiment, a disk handling compartment 22 comprises a disk handling assembly configured to move the at least one of the plurality of data storage disks 46 between the library compartment 24 and the player 36. In an exemplary embodiment, the gas generator 84 is configured to supply gas to the disk handling compartment 22. In an exemplary embodiment, the gas generator 84 is configured to supply gas to the library compartment 24. In an exemplary embodiment, a vacuum source 86 is coupled to the player 36.

In an exemplary embodiment, a sensor 88 is coupled to the player 36, wherein the sensor is at least one of a gas pressure sensor and a gas composition sensor. In an exemplary embodiment, a controller 90 is in signal communication with the sensor 88 and with the gas generator 84. In an exemplary embodiment, the gas generator 84 is configured to produce nitrogen from ambient air. In an exemplary embodiment, leaked or expelled gas from any compartment can be harvested. For example, if the leaked gas is helium, it will rise (due to its low density) to the higher elevations of a data center and can be recycled from the higher areas.

In an exemplary embodiment, a system 82 comprises a library compartment 24 housing a plurality of data storage disks 46; a player 36 external to the library compartment 24, the player 36 comprising a head 102 that is configured to interact with at least one of the plurality of data storage disks 46; and a nitrogen generator fluidly connected to the player 36. In an exemplary embodiment, a sensor 88 is coupled to the player 36, wherein the sensor 88 is at least one of a gas pressure sensor and a gas composition sensor. In an exemplary embodiment, a controller 90 is in signal communication with the sensor 88 and with the nitrogen generator. In an exemplary embodiment, a partition 26 between the library compartment 24 and the player 36 comprises a selectively openable interlock 28.

In an exemplary embodiment, a method of controlling an environment in a disk player 36 comprises producing gas with a generator 84 and directing the produced gas to the player 36; opening an enclosure of the player 36, thereby allowing exterior fluid (such as gas) to flow into the player 36; detecting a composition of a fluid environment in the player; directing a first volume of the produced gas from the generator 84 to the player 36 when the detected composition does not comprise a threshold level of the produced gas; detecting a pressure of the fluid environment in the player 36; and removing a second volume of fluid from the player 36 to maintain the pressure of the fluid environment in the player 36 below a pressure of the exterior fluid. An exemplary method comprises fluidly connecting a vacuum source 86 to the player 36. An exemplary method comprises inserting a data storage disk 46 into the player 36 during opening the enclosure of the player 36. In an exemplary method, the player 36 is disposed in a compartment 22, the method comprising obtaining the data storage disk 46 from an area outside the compartment 22 through a selectively openable interlock 28.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system comprising:
   a library compartment housing a plurality of data storage disks;
   a player comprising a head that is configured to interact with at least one of the plurality of data storage disks;
   a partition between the library compartment and the player comprising a selectively openable interlock; and
   a gas generator configured to supply gas to the player;
   wherein the player has a different gas pressure level than the library compartment.

2. The system of claim 1 wherein the player has a different gas environment composition than the library compartment.

3. The system of claim 1 comprising a disk handling compartment containing the player.

4. The system of claim 3 wherein the player has a negative fluid pressure relative to the disk handling compartment or the library compartment.

5. The system of claim 4 wherein the disk handling compartment has a positive pressure relative to the library compartment.

6. The system of claim 1 comprising a disk handling compartment comprising a disk handling assembly configured to move the at least one of the plurality of data storage disks between the library compartment and the player.

7. The system of claim 6 wherein the gas generator is configured to supply gas to the disk handling compartment.

8. The system of claim 1 wherein the gas generator is configured to supply gas to the library compartment.

9. The system of claim 1 comprising a vacuum source fluidly coupled to the player.

10. The system of claim 1 comprising a sensor coupled to the player, wherein the sensor is at least one of a gas pressure sensor and a gas composition sensor.

11. The system of claim 10 comprising a controller in signal communication with the sensor and with the gas generator.

12. The system of claim 1 wherein the gas generator is configured to produce nitrogen from ambient air.

13. A system comprising:
   a library compartment housing a plurality of data storage disks;
   a player external to the library compartment, the player comprising a head that is configured to interact with at least one of the plurality of data storage disks;
   a partition between the library compartment and the player, the partition comprising a selectively openable interlock; and
   a gas generator fluidly connected to the player.

14. The system of claim 13 comprising a sensor coupled to the player, wherein the sensor is at least one of a gas pressure sensor and a gas composition sensor.

15. The system of claim 14 comprising a controller in signal communication with the sensor and with the gas generator.

16. A method of controlling an environment in a disk player, the method comprising:
   generating a produced gas with a generator and directing the produced gas to the disk player;
   opening an enclosure of the disk player, thereby allowing exterior fluid to flow into the disk player;
   sensing a detected composition of a fluid environment in the disk player;
   directing a first volume of the produced gas from the generator to the disk player when the detected composition does not comprise a threshold level of the produced gas;
   detecting a first pressure of the fluid environment in the disk player; and
   removing a second volume of fluid from the disk player to maintain the first pressure of the fluid environment in the disk player that is different from a second pressure of the exterior fluid.

17. The method of claim 16 comprising fluidly connecting a vacuum source to the disk player.

18. The method of claim 16 comprising inserting a data storage disk into the disk player during opening the enclosure of the disk player.

19. The method of claim 18 wherein the disk player is disposed in a compartment, the method comprising obtaining the data storage disk from an area outside the compartment through a selectively openable interlock.

* * * * *